(12) United States Patent
Masson et al.

(10) Patent No.: US 7,784,365 B2
(45) Date of Patent: Aug. 31, 2010

(54) SHORT STROKE MAGNETIC POSITION SENSOR, IN PARTICULAR FOR MEASURING A STEERING COLUMN TWIST

(75) Inventors: Gerald Masson, Besancon (FR); Stephane Biwersi, Besancon (FR)

(73) Assignee: Moving Magnet Technologies (MMT), Besancon (FR)

( * ) Notice: Subject to any disclaimer, the term of this patent is extended or adjusted under 35 U.S.C. 154(b) by 7 days.

(21) Appl. No.: 12/159,901

(22) PCT Filed: Jan. 8, 2007

(86) PCT No.: PCT/FR2007/050620

§ 371 (c)(1),
(2), (4) Date: Sep. 4, 2008

(87) PCT Pub. No.: WO2007/077406

PCT Pub. Date: Jul. 12, 2007

(65) Prior Publication Data

US 2008/0314164 A1    Dec. 25, 2008

(30) Foreign Application Priority Data

Jan. 6, 2006    (FR) ................................ 06 00119

(51) Int. Cl.
*G01L 3/02*    (2006.01)
(52) U.S. Cl. .............................. 73/862.333; 73/862.331
(58) Field of Classification Search ................................
73/862.331–862.333
See application file for complete search history.

(56) References Cited

U.S. PATENT DOCUMENTS

| | | | |
|---|---|---|---|
| 3,934,269 A * | 1/1976 | Fujita et al. | ................... 360/70 |
| 4,984,474 A | 1/1991 | Matsushima et al. | |
| 4,998,084 A | 3/1991 | Alff | |
| 5,083,650 A | 1/1992 | Seiz | |
| 5,529,666 A | 6/1996 | Yesnik | |
| 5,585,166 A | 12/1996 | Kearsey | |
| 5,707,905 A | 1/1998 | Lam et al. | |
| 5,753,356 A | 5/1998 | Lam et al. | |
| 5,856,244 A | 1/1999 | Lam et al. | |

(Continued)

FOREIGN PATENT DOCUMENTS

DE    102 22 118    11/2002

(Continued)

OTHER PUBLICATIONS

U.S. Appl. No. 11/631,850, filed Aug. 23, 2007, Prudham, et al.

*Primary Examiner*—Max Noori
(74) *Attorney, Agent, or Firm*—Oblon, Spivak, McClelland, Maier & Neustadt, L.L.P.

(57) ABSTRACT

A position sensor, which can detect a steering column twist of a first magnetic rotoric structure including a plurality of radially oriented magnets and a second statoric structure including two concentric gear rings extended by radially oriented teeth. The rotoric structure is substantially disc-shaped and includes a ferromagnetic head supporting the plurality of magnets, the statoric structures are provided with interleaving teeth and the position sensor includes a third collector structure including two flow closing parts, one of which is fixed, and which define at least one air gap in which at least one magnetosensitive element is arranged.

16 Claims, 7 Drawing Sheets

U.S. PATENT DOCUMENTS

| | | |
|---|---|---|
| 5,858,883 A | 1/1999 | Lam et al. |
| 5,958,507 A | 9/1999 | Lam et al. |
| 5,998,307 A | 12/1999 | Lam et al. |
| 6,130,176 A | 10/2000 | Lam et al. |
| 6,182,804 B1 | 2/2001 | Lam |
| 6,383,605 B1 | 5/2002 | Ejiri |
| 6,831,146 B2 | 12/2004 | Aiba |
| 7,089,809 B2 * | 8/2006 | Nakane et al. ......... 73/862.331 |
| 2003/0233889 A1 | 12/2003 | Nakane et al. |
| 2004/0033341 A1 | 2/2004 | Lam et al. |
| 2005/0172732 A1 * | 8/2005 | Feng et al. ............. 73/862.332 |
| 2005/0223820 A1 * | 10/2005 | Murakami et al. ..... 73/862.331 |
| 2007/0180905 A1 * | 8/2007 | Kaoku et al. ................... 73/331 |
| 2008/0250873 A1 * | 10/2008 | Prudham et al. ....... 73/862.334 |

FOREIGN PATENT DOCUMENTS

| | | |
|---|---|---|
| DE | 203 05 732 | 7/2003 |
| FR | 2 845 472 | 4/2004 |
| FR | 2 872 896 | 1/2006 |
| GB | 2 379 277 | 3/2003 |

* cited by examiner

SHORT STROKE MAGNETIC POSITION SENSOR, IN PARTICULAR FOR MEASURING A STEERING COLUMN TWIST

The present invention relates to the field of position sensors and more particularly, position sensors for measuring a steering direction twist without this application being exclusive.

The application for a French patent FR04/07718 is known in the state of the art which describes a position sensor composed of a first rotoric structure comprising a plurality of magnets fixed on a head, a second statoric magnetic structure comprising two gear rings having a plurality of interleaving axial teeth and a third fixed collector structure composed of two portions of disc extended by bent branches closing to form a measuring air gap where a magnetosensitive element is positioned. The relative rotation of the first two structures generates a variation in the flow, in the air gap created at the level of the third structure collector structure. The sensor is characterised by a statoric structure complying with a precise sizing of the geometry of these statoric teeth, so as to improve the sensitivity of the sensor through collector structures ensuring a constant permeance to the circulation of the axial flow between the stators and the collectors and through an optimisation of the size and the mass of the various constitutive elements.

However, such a structure has a first disadvantage related to the assembling method more particularly as concerns the mainly intended application, i.e. a detection of the deformation of a torsion bar associated with the steering column of a motor vehicle. As a matter of fact, in such an application, the rotoric structure and the statoric structure are each associated with an end of the torsion bar via two concentric shaft sections opposite each other, axially. The interleaving of the rotoric structure and the statoric structure then entails a problem since it makes it necessary to increase the radial air gaps, so as to take into account the tolerances connected to the constraints resulting from the assembling and operating conditions, in the system lifetime, which is a disadvantage for the sensor in terms of sensitivity.

In addition, such a sensor structure entails the utilisation of a magnet of the homogeneous ring type and preferably having a good radial anisotropy while having a low temperature factor (typically Samarium Cobalt). But, if it is desired to use magnets having an important remanence (typically sintered magnet having a remanence greater than or equal to 1 T) so as to improve the variation in the magnetic flow and thus the sensitivity of the sensor, the important price of such materials becomes a problem since they are packaged as a ring, which makes them incompatible with the application, which entails that typically magnet rings of the Samarium Cobalt with a plastic binder are used, having a remanence of the order of 0.5 to 0.6 T.

The U.S. Pat. No. 4,984,474 is known in the state of the art. Such patent more particularly discloses a configuration using an axially oriented disc-shaped magnet, thus making it possible for the rotoric structure to be separated from the statoric part by an axial air gap, without any interleaving of these two parts and also makes it possible to use sintered magnets having a high remanence, the packaging of such magnets in the form of a disc being much more economical than in the shape of a ring. However, the structure of collectors associated with such sensor is not satisfactory. As a matter of fact, it discloses two pieces extending radially from the stators, which leads to too important a radial overall dimension. In addition, no geometrical optimisation of the teeth in order to optimise the sensitivity and the dimensions of such sensor is disclosed.

The patent DE20305732 is also known, which discloses an angular sensor comprising two disc-shaped stators, each having radially extending teeth, the teeth of one of the stators and the teeth of the other stator being respectively on either side of the permanent disc-shaped magnet. In the absence of any flow closing head, the signal detected by the Hall probe is low and sensitive to electromagnetic interferences. With respect to such problem, such a sensor has a high overall dimension, radially because of the flow collector parts radially extending the stators, as well as in thickness because of the configuration of the teeth positioned on either side of the magnet.

The patent GB2379277 relates to an angular sensor formed by a ring-shaped magnet positioned inside the stators, having each interleaving teeth. The problem entailed in this sensor is that of the flow collection which is executed by radial extensions of the stators with an angular extension entailing the magnetic leakages which deteriorate the measuring performances.

The patent US2003/233889 describes a structure of a sensor including stators positioned on either of the disc-shaped magnet. The result is a harmful overall dimension in height. In addition, the flow collection is made of radial extensions, which entail a harmful radial overall dimension.

Sensors are also known as disclosed by the German patent DE10222118, the French patent FR12845472 describing other solutions for such sensors.

The state of the art thus includes a large number of solutions, none of which solves the problem of the compactness and the quality of the signal detected by the Hall probe.

Thus, the present invention intends to provide a solution allowing an easy mounting in a reduced overall dimension with an optimised sensitivity and parts having minimum sizes and weight.

Therefor the new sensor is composed of three distinct magnetic structures: a first rotoric magnetic structure comprising a plurality of magnets fixed on a head and axially magnetized; a second statoric structure comprising two concentric gear rings having a plurality of interleaving and radially extending teeth; and a third fixed collector structure consisting of two flow closing parts extended by bent annular branches closing to form a measuring air gap in which a magnetosensitive element is arranged.

The relative rotation of the first two structures generates a variation in the flow of the air gap created at the level of the third collector structure.

The statoric structure is characterised by an accurate sizing of the statoric teeth geometry.

Such sizing rule makes it possible to obtain better performances as regards the level of the signal, linearity, sensitivity to geometry and size defects, thanks to the reduction in the thickness of the magnetic parts.

In its broadest sense, the invention relates to a position sensor, more particularly intended for measuring a steering column twist, composed of a first rotoric magnetic structure comprising a plurality of axially oriented magnets and constituting a substantially disc-shaped assembly, a second statoric structure comprising two concentric gear rings extended by radially oriented and interleaving teeth, and a third collector structure composed of two flow closing parts at least one of which is fixed, said two closing parts defining at least an air gap in which at least one magnetosensitive element is arranged, characterised in that the plurality of magnets and the toothed gear rings define therebetween an opposite surface independent of the relative radial and angular positions thereof.

Advantageously, the flow closing parts and the stator gear rings define therebetween a magnetic permeance independent of the relative axial and angular position of both structures.

Preferably, the collector structure includes two annular portions able to execute a radial flow transfer with the stators gear rings and at least two closing branches allowing a sensitive shifting between the faces opposite the stator gear rings and the faces defining the measuring air gap, defined by the following mathematical relation:

$$\frac{\text{InterStators Distance}}{\text{Measuring air gap}} > 4$$

where the air gap is defined by the minimum distance between the faces of the collectors and where the interstators distance is defined by the distance between the inner faces of the stator gear rings.

Advantageously, the stator teeth comply with the following geometrical criteria:

$$\frac{Lt \times Dt}{Li \times e} > 5$$

where:
- Lt indicates the length of the stator teeth from the end up to the inner face of the gear ring.
- Dt indicates the average tooth width calculated as the average value of the lengths of the arcs formed at the end and at the base of the tooth.
- Li indicates the interleaving of the stator teeth i.e. the radial range on which the stators enter into each other.
- e indicates the thickness of the metal sheet composing the stator teeth.

According to an alternative embodiment, the flow collector structure is made using two semi-annular angular sectors located radially outside the stator gear rings which make it possible to lead the flow up to at least a measuring air gap comprising at least one magnetosensitive element.

Advantageously, the stator teeth have a width increasing from the end towards the base.

According to a particular embodiment, the collector structure is composed of angular sectors, the angular width of the inner rib of which, as seen from the sensor axis is equal to a multiple of the angular pole pitch of the magnet.

According to another particular embodiment, the flow closing parts include annular sectors ranging on 360°.

Advantageously, the measuring air gap is able to receive a single integrated circuit including two different magnetosensitive elements.

According to another alternative, the magnet has a radial width which is substantially equal to the length of the stator teeth.

According to a first embodiment, said flow collector structure comprises at least a first inner angular sector, having a semi-tubular shape magnetically coupled with the outer surface of the inner gear ring and at least a second inner angular sector, having a semi-tubular shape magnetically coupled with the inner surface of the outer gear ring, at least one of said angular sectors, fitting without any mechanical friction on the surface of the adjacent gear ring, in that at least one magnetosensitive element is magnetically coupled with an extension of said first angular sector and with an extension of said first angular sector.

According to another embodiment, said flow collector structure includes at least one first inner angular sector having a semi-tubular shape magnetically coupled with the inner surface of the inner gear ring and at least a second inner angular sector having a semi-tubular shape magnetically coupled with the outer surface of the outer gear ring, at least one of said angular sectors fitting without any mechanical friction on the surface of the adjacent gear ring, in that at least one magnetosensitive element is magnetically coupled with an extension of said first angular sector and with an extension of said first angular sector.

According to another embodiment, each one of said angular sectors is extended by a lug extending perpendicularly to the radial plane, one of the ends extending the corresponding angular sector respectively and the other end being opposite one of the faces of the magnetosensitive element to provide a magnetic coupling.

Preferably, said lugs are bent in order to get the ends of the opposite faces of the magnetosensitive element closer to each other.

According to a particular embodiment, said flow collector structure includes at least one first angular sector, having a semi-tubular shape magnetically coupled with the inner surface on the one hand and with the outer surface of the mobile gear ring in the semi-tubular channel formed in said angular sector, on the other hand.

According to fill another embodiment, the sensor includes an assembly of at least two magnetosensitive elements coupled with at least one flow collector structure.

The various geometric criteria which are the subject of this invention will be discussed in the following paragraphs.

On the one hand, it has been shown that the length (depending on the radius) of the stator teeth is a very important criterion for the regulation of flows in this type of magnetic structure.

As a matter of fact, the interleaving of teeth, in the radial direction, must be limited, or flow leakages occur at the tips of the teeth and entail a high level of induction which makes it necessary to maintain an important tooth thickness, which in turn induces leakages between the tooth flanks.

It should be noted that the (circumferential) width of the stator teeth is also important to secure a correct linearity of the sensor. Such width can be defined by an angle which must be greater than the stroke.

In addition, it is interesting to give such teeth a trapezoidal shape, so as to increase the section available for the passage of the flow when getting closer to the bend of the teeth, since the flow is maximum at this level.

It should be added that the active surface of the tooth, i.e. the surface opposite the magnet, determines the quantity of collected flow and thus the sensitivity of the sensor.

The latter surface should thus be selected as big as possible while remaining compatible with the other parameters.

Eventually, it can be established that the optimisation of the statoric structure entails the minimising of the opposite surfaces on the opposite flanks of the stator teeth in order to limit the leakages and the maximisation of the teeth surfaces opposite the magnet.

Thus, the sizing rule ruling the sizes of stators can be expressed through a ratio of surfaces mentioned hereabove and defined by:

$$\frac{\text{Tooth length} \times \text{average tooth width}}{\text{Tooth interleaving length} \times \text{tooth thickness}} > 5$$

where the average tooth width is defined as the average value of the length of the arcs formed at the end and at the base of the teeth.

As regards FIG. 6 of the U.S. Pat. No. 4,984,474, such ratio is between one and two.

In the other known patents, the architecture of the sensor is basically different and does not make it possible to give an evaluation of this criterion.

In addition to this sizing of the stators geometry, the radial width of the magnet (i.e. the difference between its outer radius and its inner radius) will be advantageously chosen, so that it makes it possible to maintain constant an opposite surface between the magnet and the teeth even in the case where the gear rings are offset with respect to the magnet.

Thus, if "La" is the radial width of the magnet and "Lt" the length of a tooth according to the radius, the opposite surface can be maintained constant between the magnet and the teeth for excentrations lower than or equal to (Lt−La).

Such radial width can also be optimised with respect to the tooth length proper. As a matter of fact, it appears that the sensitivity of the sensor compared to the volume of the magnet reaches an optimum value when the radial width of the magnet substantially matches the tooth length which is defined by the abovementioned rule.

When such rules are applied, the flows of leakages between the teeth are limited and the level of induction in the tooth is reduced as well. It is then possible to reduce the tooth thickness, which entails a better sensitivity of the sensor.

Apart from the abovementioned criteria relating to the geometry of stators, the choices made about the configuration of the collector structure of the sensor can also bring a gain on the sensitivity of the sensor and participate in the reduction of costs.

Thus, the sensor according to the invention implies collectors which are like angular sectors of thin cylinders which allow a radial collection of the flow and which show an important bending between the flow exchange surface and the stator and the other end of the branch defining the measuring air gap.

Such configuration makes it possible to make collectors having a small thickness, which gives the advantage of limiting leakages occurring on the segments of the flow conduction branches into the air gap and thus makes it possible to increase the sensitivity of the sensor.

Then, a second geometrical criterion can be defined as being the ratio of the measuring air gap to the axial distance between the stators.

The new collector structure 30, as described in this patent has a small measuring air gap compared to the distance separating both stator gear rings and is characterised by the following equality:

$$\frac{InterStators\ Distance}{Measuring\ air\ gap} > 5$$

According to the various descriptions of the prior art, such collector parts can have various shapes or positions with respect to the stators. They are described as being inside the stators or more simply close to them according to the existing patents.

Beyond the general shape to be given to collectors, a new solution is provided in this text as regards the position of the collection angular sectors with respect to the stators, which makes it possible to clearly increase the sensitivity of the sensor.

The problem consists in positioning the collectors outside the stators so that they can be positioned as far as possible from each other while remaining circumferentially opposite the stators.

As a matter of fact, considering the leakage flows which circulate between both collectors without going through the measuring air gap, this type of collection leads to improved sensor sensitivity and participates in defining the optimised sensor as claimed in this patent.

In addition, for reasons of reliability of the torque sensor, it can be interesting to provide two magnetosensitive elements to allow a redundancy of the measurement, in case one of the probes should fail.

For this purpose, the flow collectors may have two distinct branches, thus making it possible to create two parallel measuring air gaps, wherein two separate magnetosensitive elements are positioned.

Knowing more developed electronic components exist today, which contain two magnetosensitive elements in only one integrated circuit, it is interesting to use collectors having each only one branch, so as to take advantage of the measurement redundancy while limiting the surface of the measuring air gap.

As a matter of fact, the reduction in the surface opposite both collectors increases the level of the signal and thus the sensitivity of the sensor.

Referring back to the collector structure, it is important to note that, according to a preferred embodiment, the collector annular sectors are fixed, whereas the stators are rotatingly mobile and can thus have a defective axial positioning with respect to the collectors. In an alternate solution, at least one of the angular sectors is fixed while the other can be integral with one of the gear rings. In this case, the coupling of such annular sector integral with the gear ring will be through an annular sector which can move freely with respect to the magnetosensitive element.

In order to guarantee the insensitivity of the sensor to this positioning defect, the collector angular sectors must be provided so as to be able to collect a constant radial flow in spite of a possible axial shifting between the two statoric and collector structures.

This is possible, provided that the permeance, i.e. the physical measure giving the facility with which the flow can go through such stator—collector air gap is independent of the relative axial position of both structures.

It should be reminded that the permeance relating to an air gap between two ferromagnetic parts is defined by the following relationship:

$$\Lambda = \frac{\mu \times S}{1}$$

where:
 μ indicates a constant characteristic of the material composing the air gap and also called magnetic permittivity.
 S indicates the surface area on which both parts are opposite each other.
 1 indicates the distance between the two opposite surfaces composing the air gap.

Knowing that the distance 1 is not affected by the axial shifting of the two statoric and collector structures, it is sufficient to secure a constant opposite surface to maintain a fixed permeance.

This text claims a particular shape given to the stator gear rings 23, 24 and the collector angular sectors 33, 34 which makes it possible to reach an overlapping of one part on the other, so as to make the sensor insensitive to the axial shifting between the statoric 20 and collector 30 structures.

As mentioned in greater details in the following paragraphs, the angular sectors can be sized with a smaller disk radial width than that of the stator gear rings or reversely, when the stators show a well defined collector gear ring, the angular sectors being capable of overlapping such stator gear rings.

The various particularities of the optimised angle sensor will appear more clearly when reading the following description of the figures in which:

FIGS. 1 to 3 are views showing the rotoric and statoric parts of the sensor without the collector part;

FIG. 4 shows the rotoric part, the statoric part, with the collector part inside, and the Hall probes of the sensor;

FIG. 5 is a perspective view showing a particular embodiment of the collector structure and based on a collection inside the stators;

FIGS. 6 and 7 show an alternative solution to the solution shown in FIGS. 4 and 5 with a collection outside the stators;

FIGS. 8 and 9 are a perspective view showing the geometrical criteria claimed on the statoric part;

FIG. 10 is a perspective view showing a particular embodiment of the collector structure;

FIGS. 11 and 12 are plane views showing a particular embodiment of the collector structure and based on a collection outside the stators;

FIGS. 13 and 14 are perspective views showing an alternative collector structure with a collection inside and outside the stators;

FIGS. 15 and 16 show an alternative to the solution shown in FIGS. 13 and 14.

Figure 1:
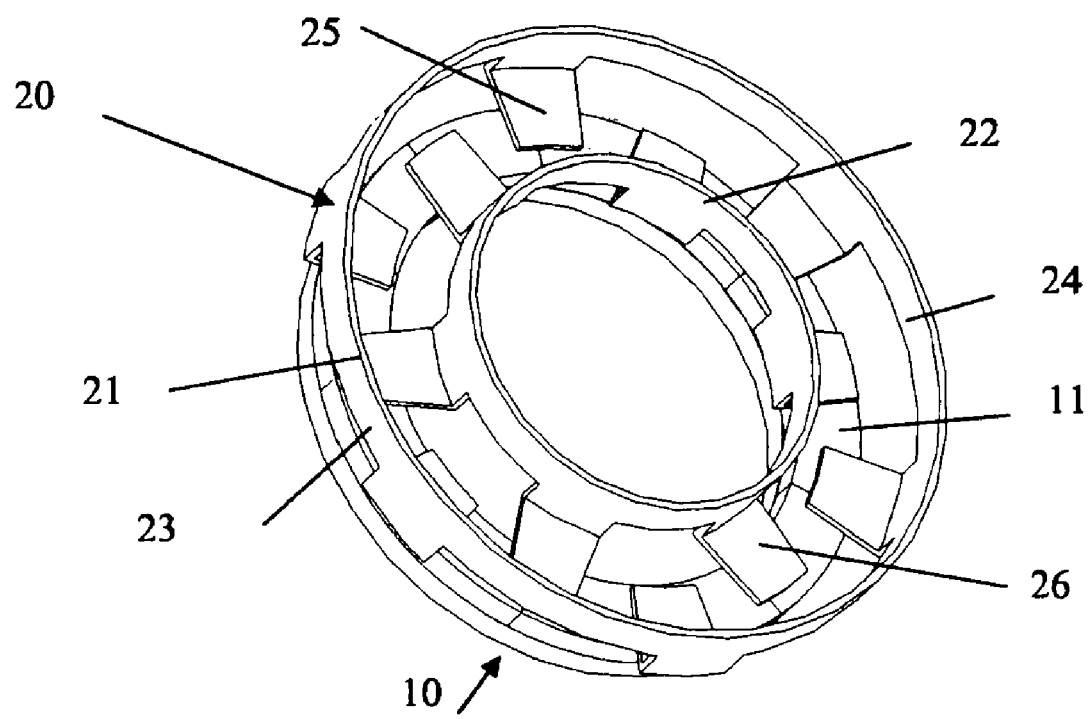
FIGS. 1 to 3 are views showing the rotoric 10 and statoric 20 parts of the sensor without the collector part. The rotoric part 10 is made of a multipolar magnet 11, axially magnetised i.e. through the thickness thereof, and a head 12 made of a ferromagnetic material to facilitate the return of the flow and thus obtain a better sensitivity and a better linearity of the sensor. In the case of FIGS. 1 to 3, the magnet shows 6 pairs of poles perfectly adapted to the measuring of the twist angle +/−7°.
Figure 2:
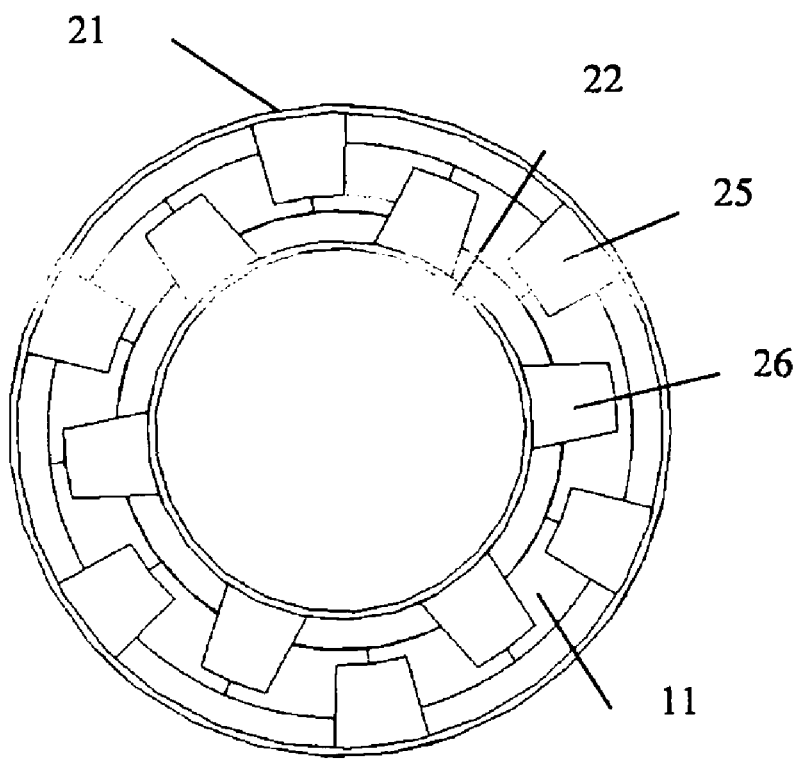
Figure 3:
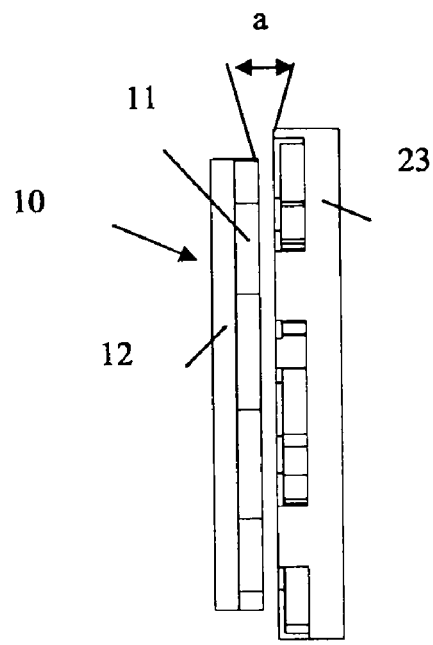

The statoric part 20 is composed of two stators 21 and 22. Each stator is made up of an annular sector 23 and 24 and of teeth 25 and 26 interleaving radially as little as possible.

The first stator 22 is made up of a tubular part which is integral with the steering column. Such tubular part is extended by teeth 26. Each one of these teeth has a first semi-tubular segment extending the tubular part, the first segment being itself extended by a part extending radially towards the outside in the transversal plane. Alternatively, the first segment can be flat. Both segments have the same width, at least up to the folding area.

The second stator 24 is made up of an outer tubular part coaxial with the tubular part of the first stator 22. Thus, it has a diameter greater than that of the tubular part of the first stator 22, the difference between both diameters being greater than twice the length of the transversal part of a tooth.

Such tubular part is extended by teeth 25. Each one of such teeth has a first semi-tubular segment extending in a direction opposite that of the first segments of the teeth 26 of the first stator. Such first segment is in turn extended by a part extending radially towards the inside, in the transversal plane. Alternatively, the first segment may be flat. Both segments have the same width, at least up to the folding area.

The radial segments of the teeth 25 and the teeth 26 are interleaved and in the same transversal plane. The disk-shaped magnet 11 is positioned in a plane parallel to the transversal plane where both radial segments of the teeth 25 and 26 are positioned.

The number of teeth in the statoric parts corresponds to the number of poles on the magnet. The teeth of the statoric parts are axially opposite the faces of the magnet with an axial distance "a" between both parts. Such axial distance is fixed upon assembling the sensor and the steering column and is fixed all through the life of the sensor.

The radial interleaving of the teeth 25 and 26 is limited and belongs to a geometrical optimisation shown in the following paragraphs. In addition, the radial height is preferably equal to the radial height of the magnet.

Figure 4:
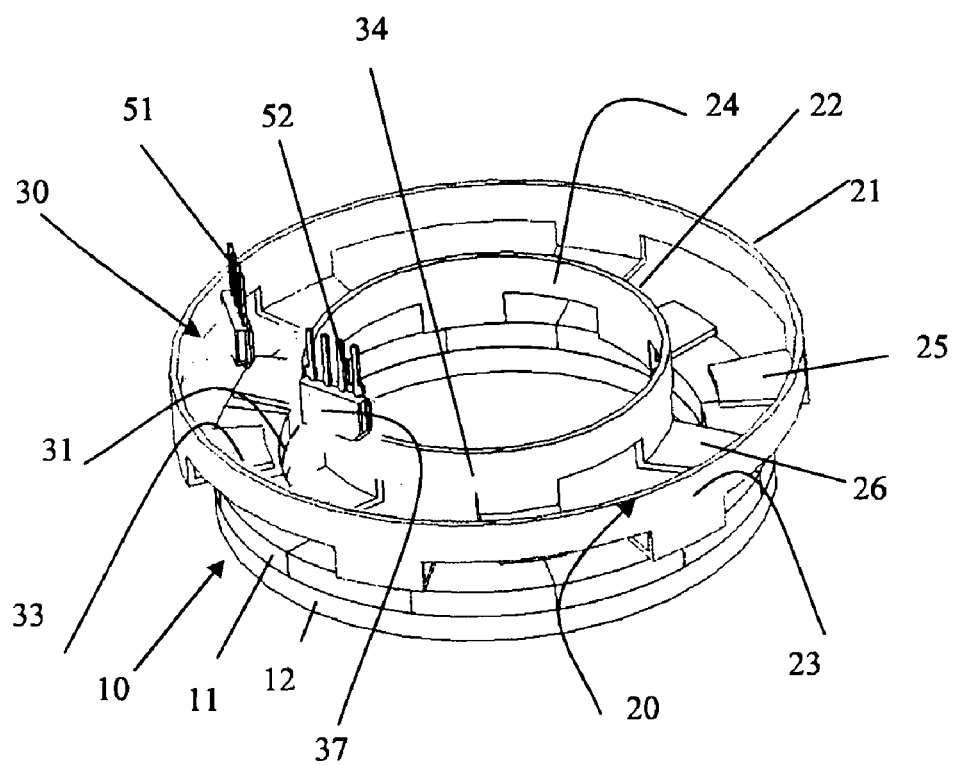

FIG. 4 is a perspective view showing a first embodiment of the sensor according to the invention, the statoric part 20 meeting the geometry rules mentioned in the following paragraph and the collector structure 30 showing the angular sectors 33, 34 inside the stators and opposite the stators gear rings 23, 24, along a radial direction.

The rotoric structure 10 includes a magnet 11 having 6 pairs of poles 21, 22 mounted on a head 12 acting on two stators 21, 22, each including 6 teeth 25, 26.

The interleaving height of the stators 21, 22 is low compared to the tooth 25, 26 length and their width is big compared to the thickness thereof. The geometry criteria relating to the sizing of the stators are thus complied with. The teeth 25, 26 have a trapezoid shape, so as to increase the section at the base of the tooth. Such trapezoid shape is particularly interesting in the case of the optimised design.

As a matter of fact, as the tooth thickness is willingly extremely reduced, such widening makes it possible to obtain a section which is sufficient for the passage of the flow, in order to avoid the saturation at the base of the tooth.

In addition, shortening of the teeth makes it possible to obtain such widening of the base of the teeth, without generating interfering flows of leakages between the side flanks 28, 29 of opposite teeth.

In addition, the multipolar magnet 11 is sized while complying with a radial width close to that of the teeth 25, 26 which thus provides the best compromise between the sensitivity of the sensor and the volume of the magnet.

Such view also provides a first solution for the collection of a flow based on two annular angular sectors 33, 34 inscribed inside the stator gear rings 33, 34 and extended by two folded branches 35, 36 which make it possible to bring the flow inside two measuring air gaps 41, 42, where two Hall probes 51, 52 are positioned, welded on a printed circuit, so as to take advantage of the redundancy of the measurement.

Thanks to this particular embodiment, the shapes and dimensions of a sensor sized to perform a measurement on a stroke of more or less eight degrees of a torsion shaft provided on a steering column, will be precisely described.

The sensor is always composed of three collector 30, statoric 20 and rotoric 10 structures, the latter being composed of a magnet having 6 pairs of poles 11, 6 mm in height, axially magnetised to form a ring 2 mm in thickness, 34 mm in inner diameter and 46 mm in outer diameter, mounted on the cylindrical head 12 having the same diameter as the magnet.

The statoric structure 20 includes two stators 21, 22 mounted opposite each other, and angularly shifted according to an angle corresponding to the polar pitch of the magnet, i.e. thirty degrees.

Each of these stators is composed of a circular gear ring 23, 24 extended on the inner part by 6 teeth 25, 26 looking like portions of cylinder 6 mm in height, radially oriented so as to cooperate with the faces of the magnets making up the first rotoric structure 10.

The teeth show an angular width, as seen from the axis of the sensor, which is increasing so as to increase the section of the flow passage in the base of the tooth knowing that the thickness of the sheet metal used is 0.6 mm.

It is also to be noted that the angular width of the inner arc of the tooth, as seen from the axis of the stator is 23° as compared to the 16° of the stroke, and so this tooth geometry is different from the previous art due to the important width, but the small length and thickness thereof.

Both stators 21, 22 are interleaved on a distance of 3 mm, so that the interstators distance, between both gear rings 23, 24, which is 9 mm.

In addition, the angular sectors 33, 34 are sized so as to cover the annular parts of the collectors gear rings 23, 24 and this overlapping guarantees the insensitivity to the axial distance of the statoric part 20, as previously discussed.

For this purpose, the collector 33, 34 has an angular length, and an axial height determined by the space between this collector and the tubular part of the corresponding statoric part 23, 24, does not vary, whatever the angular and relative axial positions of both structures. This makes it possible to guarantee a magnetic permeance independent of the positioning tolerances.

Of course, such insensitivity is true below a certain limit of the axial shifting of both structures.

Such limit is defined by the difference in the axial height of the statoric annular parts 23, 24 and the axial height of the angular sectors 33, 34.

Such sizing thus leads to insensitivity to the axial shifting of the statoric structure 20, with respect to the collector structure 30, so long as such shifting is less than +/−0.5 mm.

Two branches 35, 36, 3 mm in width, extend the angular sectors 33, 34 and make it possible to contain the flow in a measuring air gap 40, 1.45 mm in height, axially positioned inside the stator 21, 22 and wherein the magnetosensitive element 50 is positioned and held by a printed circuit.

Figure 5:
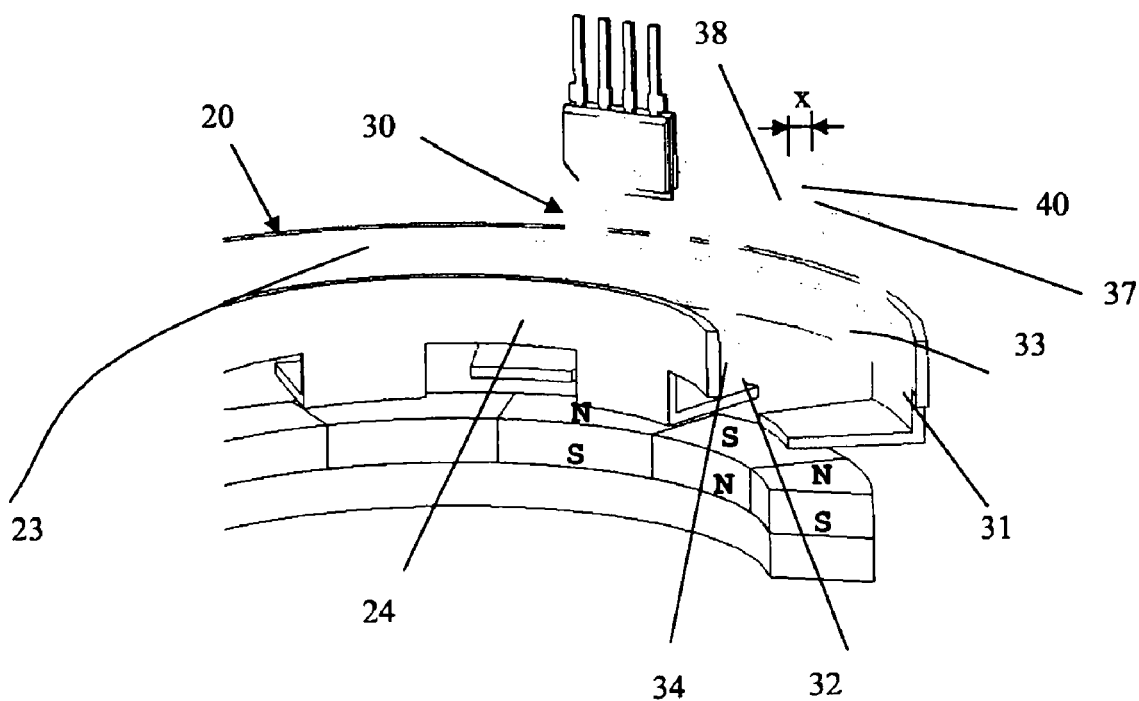

FIG. 5 is a view showing the third magnetic structure of the sensor. This is the collector structure 30 which is fixed and makes it possible to collect the flow on the stators gear rings 23, 24 and to concentrate it in the measuring air gap 40.

Such structure is made up of two parts 31, 32, each one being constituted of a portion of a concentric ring 33, 34 which is so designed as to be able to operate an exchange of flow between the stators and the collectors, in the radial direction of the sensor.

The collectors 31, 32 have angular sectors 33, 34, the axial height of which is smaller than that of the stators gear rings 23, 24, and makes it possible to accept a defective axial play between the statoric structure 20 and the collector structure 30.

The collector parts 31, 32 have an important shifting between the annular portions 33, 34 and the small faces 37, 38 making up the measuring air gap 40.

Such particularity makes it possible to limit the leakages between the collector parts 33, 34 of the flow which remain far from each other, and to maintain an air gap 40 having a reduced width (x) in order to concentrate the flow as much as possible and increase the sensitivity of the sensor.

Eventually, the magnetic collector structure can be distinguished from the prior art in that the collector angular sectors 33, 34 are so designed as to be able to operate a radial transfer of the flow, in that they are fully inscribed inside the stators gear rings 23, 24, in order to have a permeance independent of the relative axial position of both structures 20 and 30, and eventually they have an important bending generating a substantial shifting between the angular sectors 33, 34 and the faces 37, 38 making up the measuring air gap 40.

Figure 6:
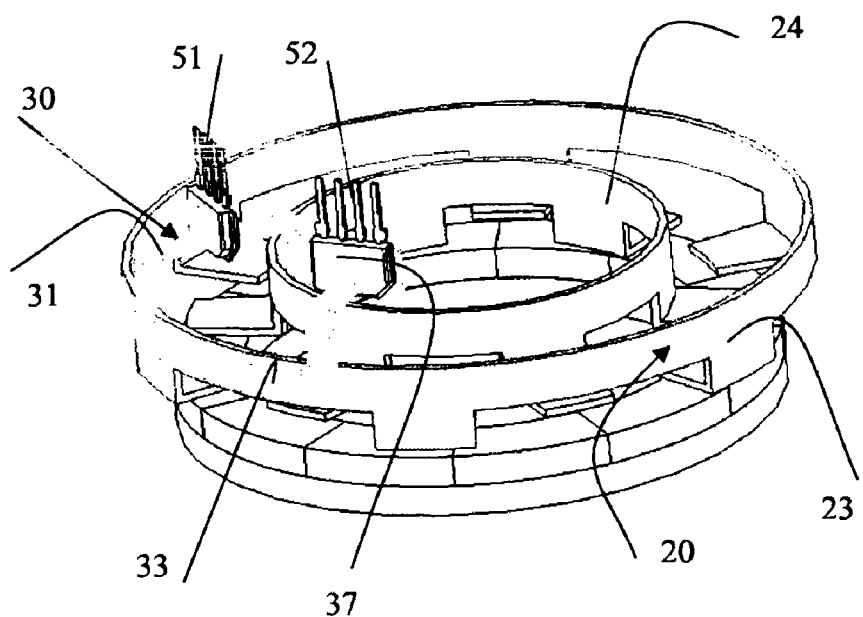
Figure 7:
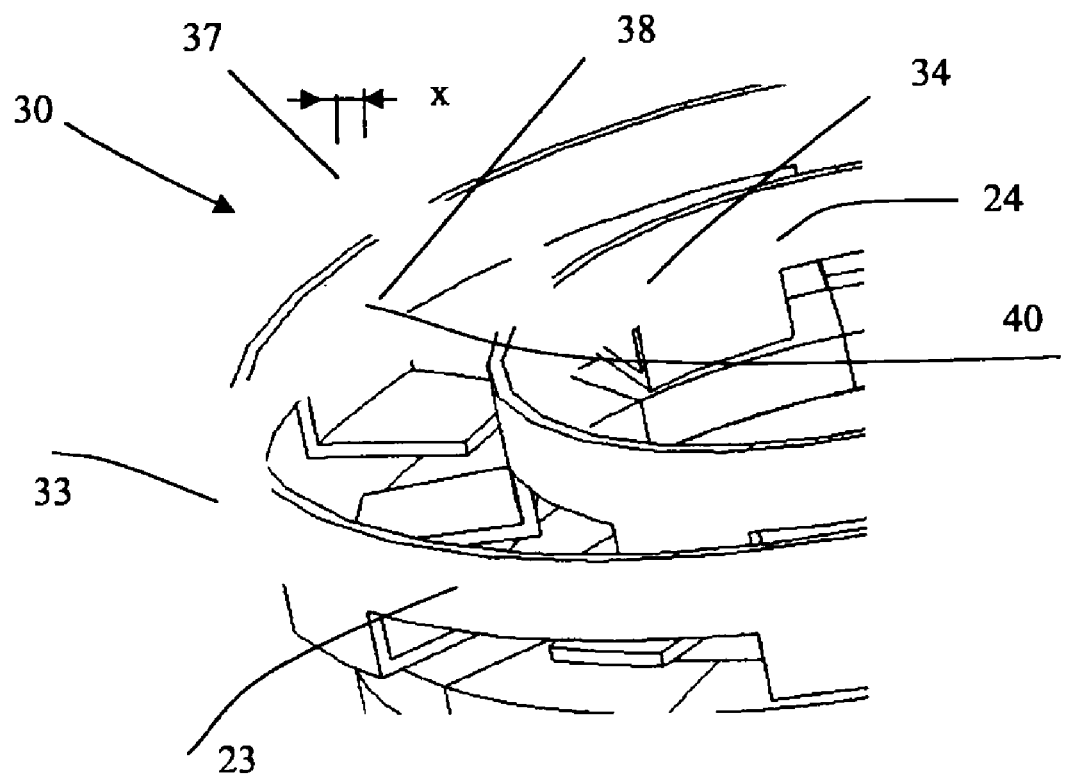

FIGS. 6 and 7 have an alternative in FIGS. 4 and 5, and show an embodiment, wherein the annular sectors 33, 34 of the flow collector parts 31, 32 are positioned outside the stators 21, 22.

Such positioning outside the stators makes it possible to increase the sensitivity of the sensor by limiting the leakages occurring between both annular portions 33 and 34 to even more concentrate the flow in the measuring air gap 40.

This solution offers, on the one hand, a gain in the quantity of the collector flow, which shows in a gain in the sensitivity of the sensor and, on the other hand, an interest as regards the tolerance of the sensor to the defective axial clearance of the stators 23, 24, which can thus be manufactured with not so strict geometrical tolerances and for lower costs.

Figure 8:
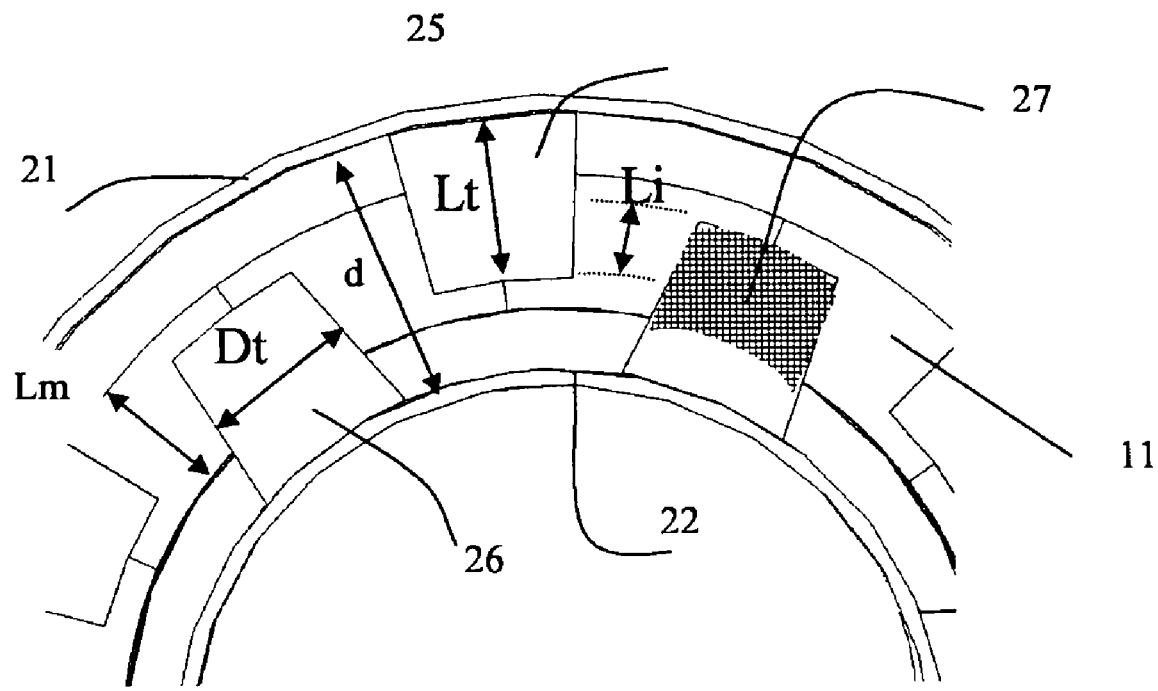

FIG. 8 is a diagram which corresponds to a top view showing the magnet 11 as well as both stators 21, 22 including interleaving radial teeth 25, 26.

Such diagram shows that the teeth are not radially extended up to the second stator and that the width (Dt) thereof is close to the length (Lt) thereof.

Such geometrical specificities make it possible to reduce the tooth thickness, as well as that of the collectors to reach a performing and less costly sensor.

Figure 9:
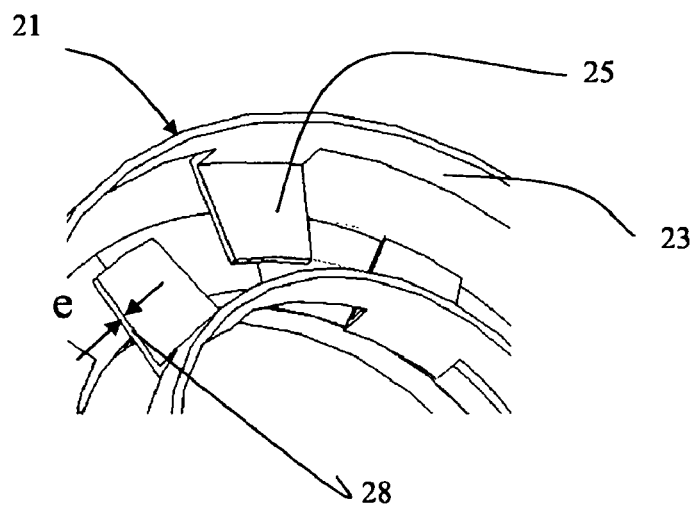

FIG. 9 associated with FIG. 8 shows a perspective view of a stator tooth 25 in order to show the tooth thickness (e) and the tooth side surface 28 mentioned in the following paragraphs.

In the configuration shown in both FIGS. 8 and 9, it appears that the ratio of the tooth useful surface 27 opposite the magnet 11 to the side surface of the leakages between the teeth 28 is high, it checks the relation expressed in the previous sections, i.e. a ratio above 5.

It should also be noted that the radial height Lm of the magnet 11 is substantially equal to the radial height Lt of the teeth 25, 26 and thus clearly lower than the distance between stators (d).

This view shows the various geometrical parameters to be considered when sizing the stators.

The following should be noted:

Lt: the radial length of the stator teeth from the end up to the inner surface of the gear ring.

Li: the radial extent on which the stators are interleaved or the interleaving height of the teeth.

Lm: the radial width of the magnet.

Dt: the average angular tooth width calculated as the average value of the length of the arcs formed at the end and at the base of the tooth.

e: the tooth thickness in the axial direction with respect to the stator.

Such parameters make it possible to define a ratio between the active surface and the leakage surface of the teeth, a ratio which makes it possible to define a characterising relation of the sensor provided.

Figure 10:
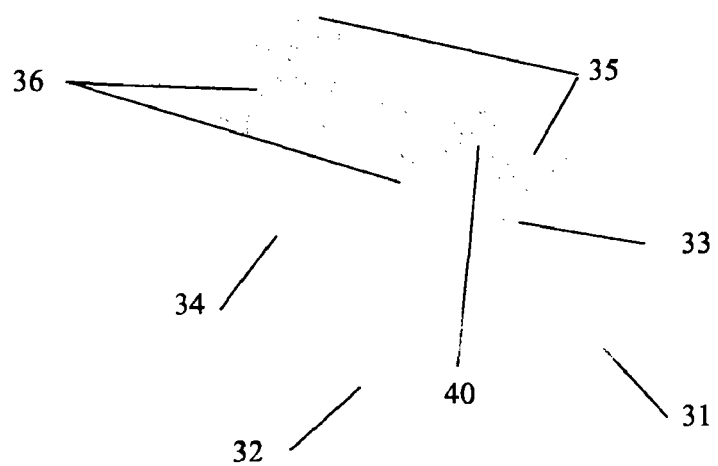
Figure 11:
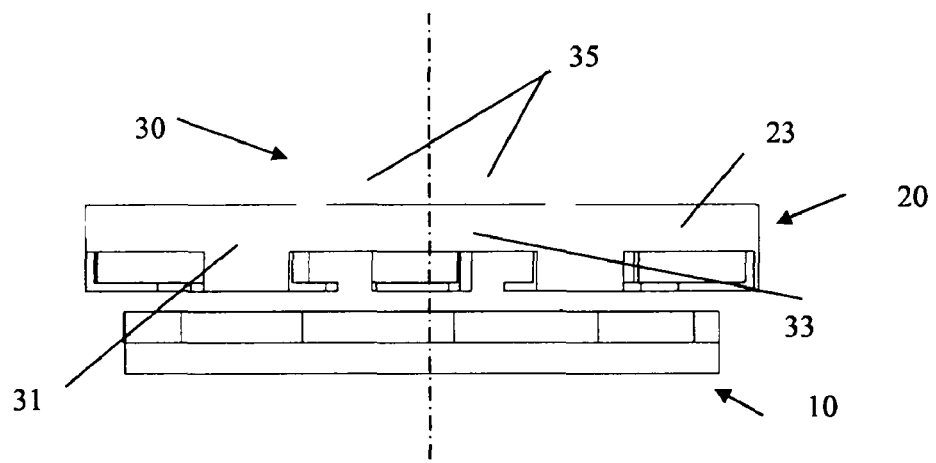
Figure 12:
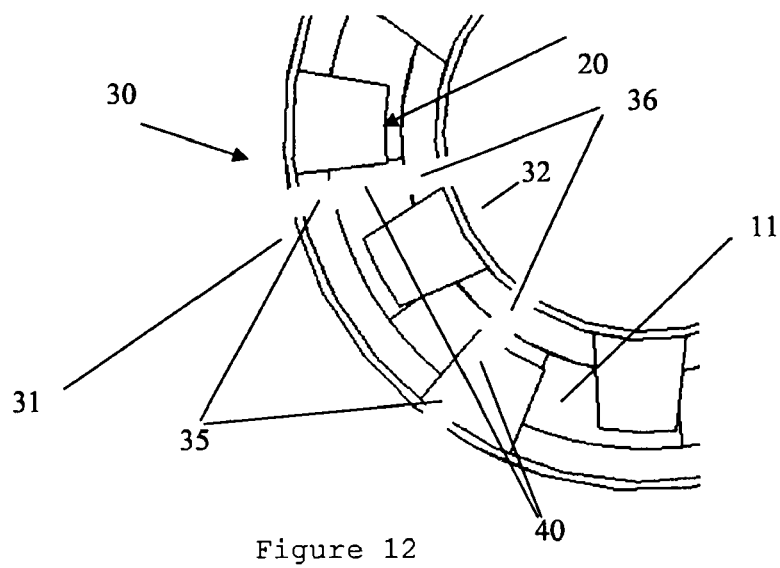

FIGS. 10, 11 and 12 show an embodiment for the angular sectors 33, 34 of the flow collector parts 31, 32, which are positioned outside the stators 21, 22.

Such positioning outside the stators makes it possible to improve the sensitivity of the sensor, while limiting the leakages occurring between both annular portions 33 and 34 to even more concentrate the flow in the measuring air gap 40.

Such solution provides, on the one hand, a gain in the quantity of the collected flow which equals a gain in the sensitivity of the sensor and, on the other hand, an interest as regards the tolerance of the sensor to the defective axial and radial clearances of the stators 23, 24 which can thus be manufactured with not so strict geometrical tolerances and at lower costs.

Figure 13:
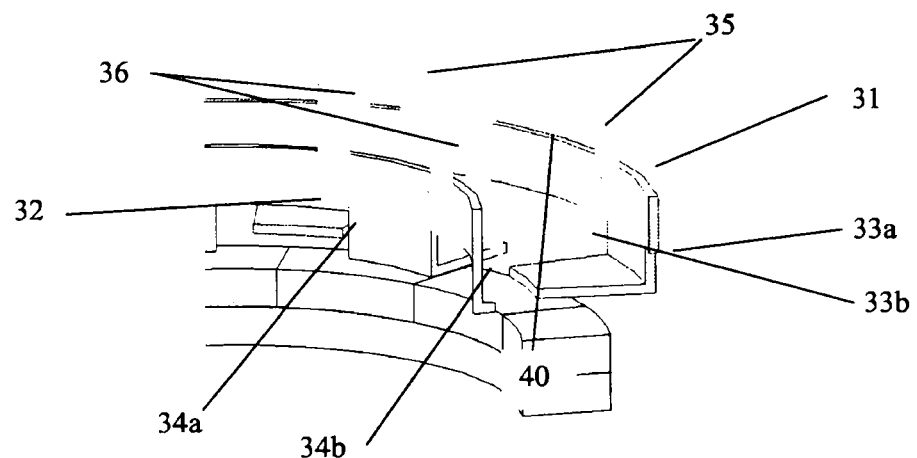
Figure 14:
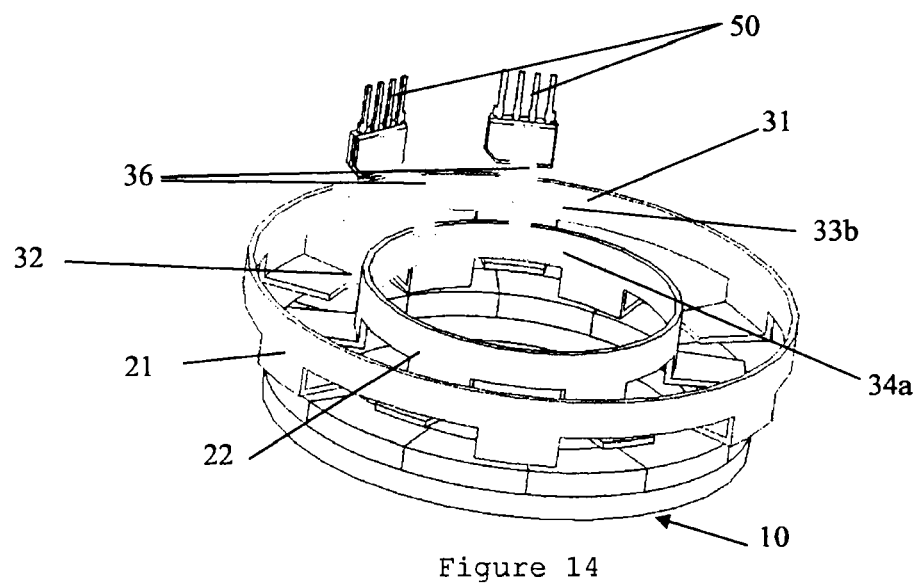

FIGS. 13 and 14 show a second embodiment of the solution provided, wherein a collector structure is shown comprising 4 annular portions 33a, 33b, 34a and 34b to even more concentrate the flow in the measuring air gap. Both collector pairs 31 and 32 have, each, two annular portions positioned inside and outside the stators 21 and 22. As in the previous figure, the flow collector parts 31, 32 having the shape of circular sectors 33a, 33b, 34a, 34b which have an axial height which is smaller or bigger than the annular sector of the stators 23 and 24 to be insensitive to the axial clearance of the sensor.

Figure 15:
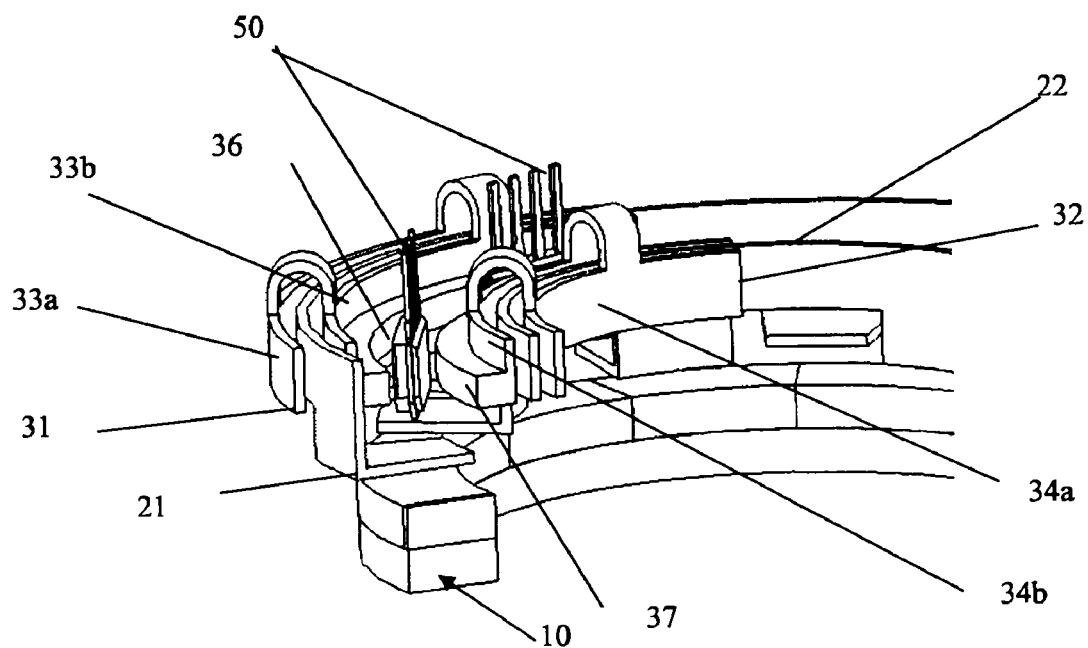
Figure 16:
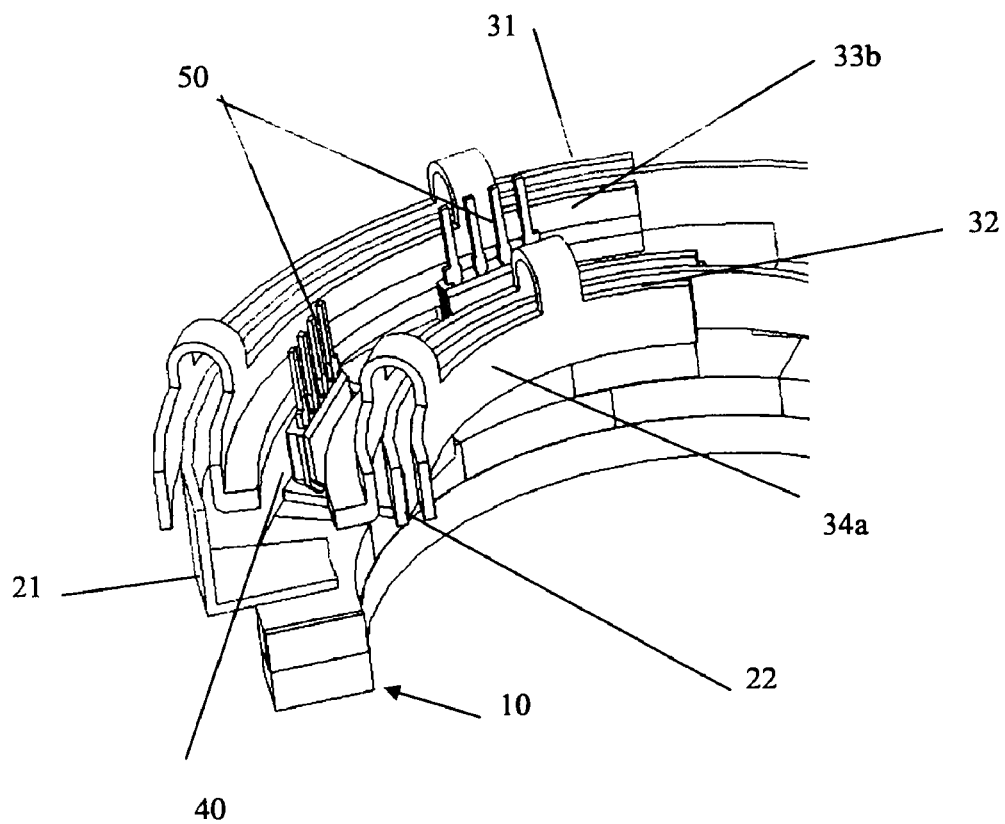

FIGS. 15 and 16 show an alternative solution to that shown in FIGS. 11 and 12. Such solution can be distinguished from the previous one by the presence of only one air gap 40 positioned between the annular sectors 36 and 37, instead of two measuring air gaps. Two Hall probes or more may be inserted in this measuring air gap. The sectors 36 and 37, which define the measuring air gap, have an angle similar to or smaller than the angle of the annular sector 33b and 34b, respectively. Such solution also makes it possible to have an easier positioning of the Hall probe in the measuring air gap thereof.

The invention claimed is:

1. A position sensor comprising:
a first magnetic rotoric structure including a plurality of axially oriented magnets and a second statoric structure including two concentric gear rings extended by radially oriented teeth;
wherein the rotoric structure is substantially disc-shaped and includes a ferromagnetic head supporting the plurality of magnets,
wherein the gear rings of the statoric structure include interleaving teeth; and
further comprising a third collector structure including two flow closing parts, one of which at least is fixed, the at least two closing parts defining at least an air gap in which at least one magnetosensitive element is positioned.

2. A position sensor according to claim 1, wherein the flow closing parts and the stator gear rings define therebetween a space having a constant dimension, so as to define a magnetic permeance independent of the relative axial and angular position of the second and third structures.

3. A position sensor according to claim 1, wherein the collector structure includes two annular portions configured to execute a radial flow transfer with the stator gear rings and at least two closing branches allowing a sensitive shifting between the faces opposite the stator gear rings and the faces defining the measuring air gap defined by mathematical relation:

$$\frac{InterStators \; Distance}{Measuring \; air \; gap} \geq 4$$

where the air gap is defined by the minimum distance between the faces of the collectors and the InterStators Distance is defined as the distance between the inner faces of the stator gear rings.

4. A position sensor according to claim 1, wherein the stator teeth comply with geometric criteria:

$$\frac{Lt \times Dt}{Li \times e} > 5$$

wherein:
Lt indicates the length of the stator teeth from the end up to the inner face of the gear ring,
Dt indicates the average tooth width calculated as the average value of the lengths of the arcs formed at the end and at the base of the tooth,
Li indicates the interleaving of the stator teeth, which is the radial range on which the stator gear rings enter into each other, and
e indicates the thickness of the metal sheet composing the stator teeth.

5. A position sensor according to claim 1, wherein the flow collector structure includes two semi-annular angular stators located radially outside the gear rings that make it possible to lead the flow up to at least one measuring air gap including at least one magnetosensitive element.

6. A position sensor according to claim 1, wherein the stator teeth have a width increasing from the end towards the base.

7. A position sensor according to claim 1, wherein the collector structure is composed of angular sectors, an angular width of an inner rib of which, as seen from the sensor axis, is equal to an angular pole pitch of the magnet.

8. A position sensor according to claim 1, wherein the flow closing parts include annular sectors ranging on 360°.

9. A position sensor according to claim 1, wherein the air gap is configured to receive a single integrated circuit including two different magnetosensitive elements.

10. A position sensor according to claim 1, wherein the magnet has a radial width substantially equal to the length of the stator teeth.

11. A position sensor according to claim 1, wherein the flow collector structure includes at least a first inner angular sector having a semi-tubular shape magnetically coupled with the outer surface of an inner one of said gear rings, and at least a second inner angular sector having a semi-tubular shape magnetically coupled with the inner surface of an outer one of said gear rings, at least one of the angular sectors fitting without any mechanical friction on the surface of the adjacent ring, wherein at least one magnetosensitive element is magnetically coupled with an extension of the first angular sector and with an extension of the second annular sector.

12. A position sensor according to claim 1, wherein the flow collector structure includes at least one first inner angular sector having a semi-tubular shape magnetically coupled with the inner surface of an inner gear rings, and at least a second inner angular sector having a semi-tubular shape magnetically coupled with the outer surface of an outer one of said gear rings, at least one of the angular sectors fitting without any mechanical friction on the surface of the adjacent gear ring, wherein at least one magnetosensitive element is magnetically coupled with an extension of the first angular sector and with an extension of the second angular sector.

13. A position sensor according to claim 11, wherein each one of the angular sectors is extended by a lug extending perpendicularly to the radial plane, one of the ends extending the corresponding angular sector respectively and the other end being opposite one of the faces of the magnetosensitive element to provide a magnetic coupling.

14. A position sensor according to claim 11, wherein lugs are bent to get the ends of the opposite faces of the magnetosensitive element closer to each other.

15. A position sensor according to claim 1, wherein the flow collector structure includes at least a first angular sector having a semi-tubular shape magnetically coupled with the inner surface and with the outer surface of a mobile one of said gear rings in the semi-tubular channel formed in the angular sector.

16. A position sensor according to claim 1, further comprising an assembly of at least two magnetosensitive elements coupled with at least one flow collector structure.

* * * * *